May 9, 1939.  L. L. SCOTT  2,157,742
INTERNAL COMBUSTION ENGINE
Filed Aug. 16, 1937   3 Sheets-Sheet 1
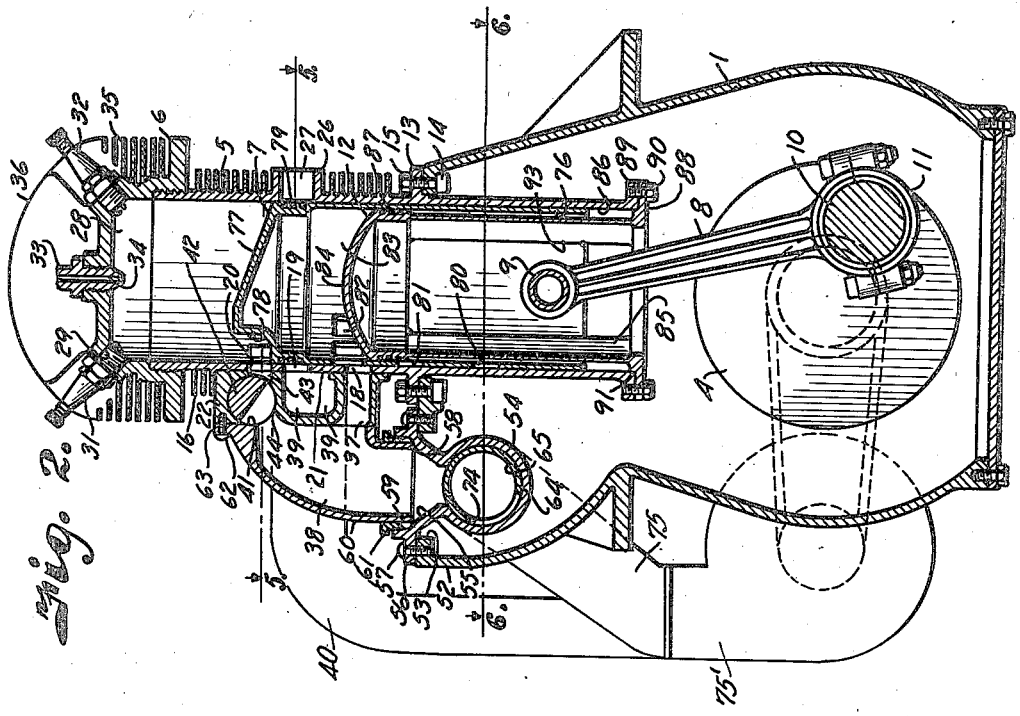
INVENTOR
Leland L. Scott.
BY
ATTORNEY

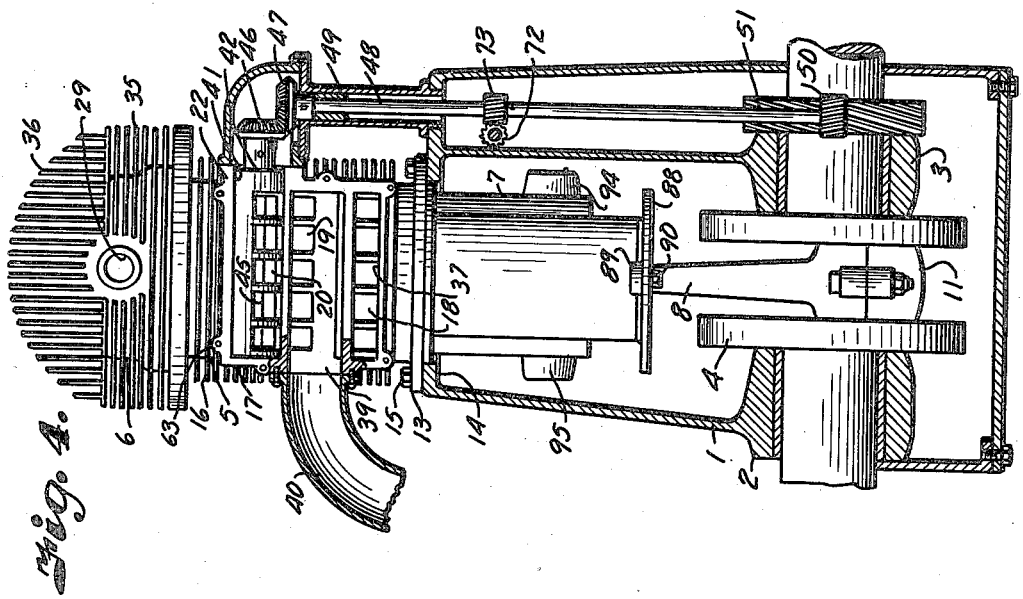

May 9, 1939.  L. L. SCOTT  2,157,742
INTERNAL COMBUSTION ENGINE
Filed Aug. 16, 1937   3 Sheets-Sheet 3
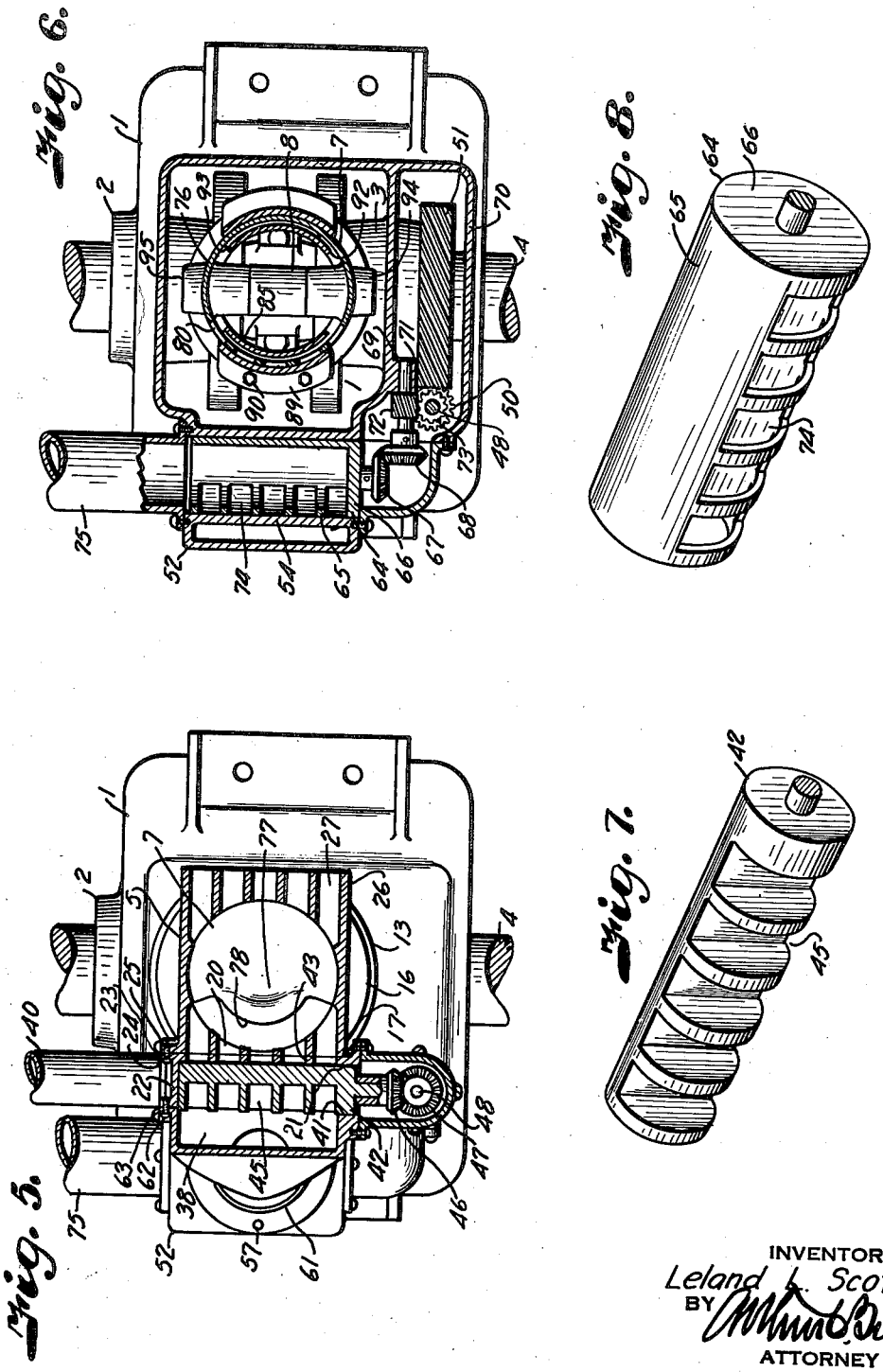
INVENTOR
Leland L. Scott.
BY
ATTORNEY Patented May 9, 1939

2,157,742

UNITED STATES PATENT OFFICE 2,157,742

INTERNAL COMBUSTION ENGINE

Leland L. Scott, Kansas City, Mo.

Application August 16, 1937, Serial No. 159,276

12 Claims. (Cl. 123—74)

This invention relates to internal combustion engines, and has for its principal object to provide for supercharging or overvoluming the combustion chamber with a combustion supporting medium, thereby adapting the engine for high altitude aircraft purposes and high efficiency work.

Other important objects of the invention are to provide an engine constructed for the introduction of air into the combustion chamber for scavenging the cylinder of all the spent gases remaining from a previous combustion; to provide the engine with means for supercharging the scavenged combustion chamber with an overvolume of combustion supporting medium; to effect increase in pressure of initially supercharged combustion medium upon downstroke of the power piston; to provide means in cooperation with the piston for forming an inner compression chamber wherein the increase in pressure is effected; to provide the engine with by-pass means whereby the further compressed medium is by-passed into the combustion chamber for its final compression; and to provide means for introducing a fuel into the combustion supporting medium during final compression in the combustion chamber.

It is also an important object of the invention to provide simple and reliably operated valve mechanisms for controlling flow of combustion supporting medium into the by-pass chamber, and from the by-pass chamber into the combustion chamber.

In accomplishing these and other objects of the invention, as hereinafter pointed out, I have provided improved details of structure, the preferred form of which is illustrated in the accompanying drawings, wherein:

Fig. 1 is a vertical section through an internal combustion engine constructed in accordance with the present invention, and showing the power piston at the end of the power stroke.

Fig. 2 is a similar section showing the power piston moving on its compression stroke.

Fig. 3 is a similar section showing the power piston at top dead center and ready to begin its power stroke.

Fig. 4 is a section on the line 4—4 of Fig. 1.

Fig. 5 is a horizontal section through the engine on the line 5—5 of Fig. 2.

Fig. 6 is a similar section on the line 6—6 of Fig. 2.

Fig. 7 is a detail perspective view of the valve for controlling overvoluming of the combustion chamber.

Fig. 8 is a perspective view of the valve for controlling inlet of combustion supporting medium to the by-pass chamber.

Referring more in detail to the drawings:

In the present drawings I have illustrated my invention as embodied in a two-cycle engine, which includes a crank-case 1 having crank-shaft bearings 2 and 3 for rotatably mounting a crank-shaft 4. Supported on the crank-case 1 is a cylinder 5, having its upper end closed by a head 6, as in conventional practice. Reciprocable in the cylinder is a power piston 7, having operative connection with the crank-shaft 4 through a connecting rod 8 that is connected with the power piston by a wrist pin 9, and with the crank 10 of the shaft 4 by the usual bearing 11. The lower end of the cylinder projects within the crank-case and carries a fixed head or piston 12. The cylinder 5 includes a sleeve-like wall having a lateral flange 13 that seats on an inwardly extending flange 14 of the crank-case and which is secured thereon by fastening devices, such as bolts, 15. The portion of the sleeve-like wall extending above the crank-case is provided with suitable radiating means, such as fins, 16 for carrying off the heat of combustion. Formed on one side of the cylinder is a substantially rectangular shaped boss 17, having superimposed rows of ports 18, 19 and 20 opening into the cylinder. The outer face 21 of the boss is flattened, and secured thereto is a valve and by-pass block 22, the block being provided at its perimeter with a lateral flange 23 having openings through which fastening devices 24 are extended into an abutting flange 25 of the boss.

The ports 18, 19 and 20 are preferably of rectangular shape and of proper area to provide for the necessary inflow of air into the combustion chamber. Located on the opposite side of the cylinder is a similar but shorter boss 26 having a series of ports 27 of substantially rectangular cross-section and located with the lower edges thereof substantially in horizontal alignment with the lower edges of the scavenging ports 19. The exhaust ports are preferably of longer dimensions so that they are uncovered by the power piston slightly in advance of the scavenging ports to permit initial discharge of the spent gases before introduction of the scavenging air through the ports 19.

The cylinder head 6 is illustrated as threadedly mounted on the upper end of the cylinder and has an internal firing chamber 28 registering in axial alignment with the combustion chamber of the cylinder. Mounted in threaded ports 29 and 30 at opposite diametrical sides of the firing chamber are spark-plugs 31 and 32 which may be of any conventional design for igniting fuel charges in the firing chamber as later described. Threaded into the top of the cylinder head is an injection nozzle 33 having a fuel passageway 34 through which a fuel is discharged into the firing chamber. The cylinder head is provided about its periphery with a plurality of circumferential fins 35, while the top thereof has a series of transverse fins 36 cooperating with the fins of the cylinder to carry away the heat of combustion.

Formed in the block 22, in alignment with the lower series of ports 18, is a by-pass duct 37 for flow of overvoluming medium, such as air, to and from a by-pass chamber 38, later described. Also formed in the block, and separated from the by-pass chamber, is an air scavenging passageway 39 for direct communication with the scavenging ports 19. The air scavenging passageway 39 is closed at one end of the block and its other end is in open communication with a pipe 40 leading to a source of air supply, for example an air compressor or blower, whereby the scavenging air is discharged into the passageway under pressure, for injection through the ports 19 as later described.

Formed in the block, in substantially horizontal alignment with the upper series of ports 20, is a cylindrical bore 41 for rotatably mounting a cylindrical valve 42. Located in registry with the ports 20 are ports 43 communicating with the bore 41. The bore is also open on the opposite side through a port 44 to the by-pass chamber 38. The valve 42 is best illustrated in Fig. 7, and includes a cylindrical body of sufficient length to bridge all of the ports 20, and which is provided with a plurality of transverse grooves or passageways 45 registering therewith to permit flow of overvoluming air from the by-pass chamber. The grooves 45 extend into the body of the valve to substantially the axis thereof so that when the valve is turned with the grooves in downward position, as illustrated in Fig. 2, communication is established between the port 44 and the ports 43.

Mounted on the end of the valve, opposite the pipe 40, is a bevel gear 46 whereby the valve is rotated in timed relation with the power piston. The gear 46 meshes with a similar gear 47 on a shaft 48 that is rotatably mounted in bearings 49, and which has a spiral gear 50 on its lower end meshing with a spiral gear 51 on the crank shaft (Fig. 1).

Formed in the crank-case, on the side adjacent the by-pass and valve block, is a lateral extension 52, having an opening 53 in the top thereof for suspending a rotary inlet valve casing 54. The inlet valve casing 54 is of cylindrical shape and has an outwardly flaring throat 55, having lateral flanges 56 for seating on top of the crank-case, as clearly shown in Figs. 1, 2 and 3, the flanges being secured by fastening devices, such as cap screws, 57 extending therethrough and into threaded sockets. Formed in the throat 55 of the valve casing is a port 58 having a circumferential recess 59 for seating the lower end 60 of the by-pass chamber which is sealingly retained therein by a suitable packing gland 61. The by-pass chamber is of substantially L-shape and has a flattened portion covering the ports 37 and 44 and is secured to the block by fastening devices 62, extending through flanges 63 and into threaded sockets of the block.

Rotatably mounted in the inlet valve casing is a tubular type rotary valve 64, having a cylindrical wall 65 of suitable outer diameter to snugly engage the inner diameter of the valve casing and a closed end 66 which is provided in the axis of the valve with a bevelled gear 67, meshing with a bevelled gear 68 on a counter-shaft 69. The shaft 69 is rotatably mounted in an extension 70 of the crank-case, in suitable bearings 71, and has a spiral gear 72, meshing with a spiral gear 73 on the shaft 48. The cylindrical wall of the valve is provided with a series of ports 74 adapted to register with the port 58 when the valve is in proper position. The end of the valve opposite the gear 67 is open to communicate with an overvoluming air supply pipe 75 leading to a source of supply, such as a compressor or blower 75'. If desired, the pipes 40 and 75 may be connected to a blower 75' as shown in Fig. 2 which may have separate stages for supplying the respective pipes. The power piston 7 includes a cylindrical skirt portion 76 slidably engaged with the wall of the cylinder and having a head 77 on its upper end shaped to provide a baffle, whereby the air admitted through the respective ports is directed upwardly along that side of the cylinder when it strikes a substantially arcuate shaped shoulder 78 of the baffle, having the face thereof extending substantially parallel with the axis of the cylinder, the shoulder being of sufficient length to bridge all of the port openings in each series. The opposite side of the baffle slopes downwardly in cone-like formation toward the opposite wall so as to provide a guide for the spent products of combustion and facilitate their exit through the exhaust ports. The upper portion of the skirt is provided with a series of piston rings 79, as in conventional practice. Formed in the skirt portion of the piston, in proper spaced relation to give the desired timing, is a plurality of superimposed rows of ports 80, 81 and 82 to provide communication between the ports 18, 19 and 20 with the compression chamber 83 that is formed between the pistons.

The fixed piston 12 includes a rounded head 84, having a depending skirt 85 spaced inwardly from the wall of the combustion chamber to provide an annular passage 86 for the skirt of the power piston. The head 84 carries piston rings 87 to effect a seal between the fixed piston and the inner face of the skirt of the power piston. The portion of the skirt below the piston rings is of slightly reduced diameter to allow ample clearance for the skirt of the power piston, and carries a flange 88 on its lower end that is rigidly attached to a similar flange 89 on the lower end of the cylinder wall by fastening devices, such as cap screws, 90. The flange 88 is preferably provided with an annular shoulder 91 that engages within the end of the cylinder to center the head 84 within the cylinder. Formed in the sides of the skirt of the fixed piston, at points directly above the crank-shaft, are slotted openings 92 and 93 to pass the ends of the wrist pin 5, and to accommodate the wrist pin supporting bosses 94 and 95 on the skirt of the power piston, as clearly shown in Fig. 6.

With the construction above described, the power piston cooperates with the fixed piston to form a closed compression chamber for compressing the overvoluming or combustion supporting air prior to its admission to the combustion chamber by way of the by-pass, as later described.

In operating an engine constructed and assembled as described, the crank-shaft 4 is rotated to effect initial operation of the power piston. Assuming that the power piston is moving on its upstroke, a partial vacuum is formed in the compression chamber 83 incidental to the increasing capacity of the chamber. Air will then be drawn into the compression chamber, not only through the ports 18 and 80 but from the inlet rotary valve 64 which is open for communication with the by-pass chamber 38, and on continued upstroke of the power piston air is forced in with the supercharger for the full upstroke of the piston as the ports in the skirt of the piston successively move across the ports 18 and 19. When the power piston has reached the top of the stroke, the compression chamber will contain an overvoluming supply of air at a pressure substantially that supplied by the supercharger. By the time the power piston has reached the end of its upstroke, the rotary valve 64 will have closed the ports communicating with the by-pass chamber. The power piston then begins its downstroke and the air within the compression and by-pass chambers will be further compressed as the head of the power piston approaches the head of the fixed piston. As the ports in the skirt of the power piston repass the inlet ports 18 the pressure of air in the inner piston chamber at this point of the piston travel will equal the pressure of air from the blower. As the power piston reaches the end of its downstroke, the piston uncovers the ports 19 so that scavenging air is directed from the passageway 39 into the combustion chamber, and the air is directed by the baffle upwardly along the side wall thereof and across the top to the opposite side for outflow through the exhaust ports, thereby assuring that the combustion chamber is filled with pure air at substantially or perhaps slightly greater than atmospheric pressure owing to the pressure afforded by the blower.

By the time the power piston has reached the lower limit and has started on its upstroke, the rotary valve 42 is moving toward open position. As soon as the piston has moved sufficiently to substantially cover the exhaust ports and to register the ports 82 with the ports 18, the rotary valve 42 is open so that the air compressed in the compression chamber and by-pass is transferred to the combustion chamber through the ports 44, grooves 45 and ports 20. I find that by proper reduction of the space between the heads of the pistons, and with the proper size by-pass, the volume of air within the combustion chamber, after supercharging, may be as high as two volumes or two atmospheres, so that the invention is adapted for very high altitude work with airplanes and for high efficiency in rarefied atmospheres. The power piston continues its upstroke and the valve 42 moves to close the ports 20, so that the supercharging air is trapped in the combustion chamber and further compressed by action of the power piston. A fuel is then injected through the nozzle 33 during a selected portion of the remainder of the upstroke of the power piston. At the top of the piston stroke, or at the proper time, the compressed charge is ignited by the spark-plugs 31 and 32. Expansion, due to combustion, of the fuel charge now drives the piston on the power stroke, rotating the crankshaft of the engine under power generated incidental to the burning gases. As soon as the head of the piston uncovers the exhaust ports, the burnt gases begin to escape therefrom, and shortly after the piston uncovers the scavenging ports 19 so that scavenging air is blown into the combustion chamber to completely scavenge all of the spent gases through the exhaust ports and to fill the combustion chamber with a fresh supply of air at or near atmospheric pressure. On the upstroke of the piston, the combustion chamber is again supercharged with air by the air that has been compressed in the compression chamber during the power stroke of the piston, in the manner above described, thus continuing the cycles of operation.

What I claim and desire to secure by Letters Patent is:

1. In an engine of the character described, a combustion chamber having a series of inlet ports, a fixed piston, a movable piston in the combustion chamber having a skirt slidable over the fixed piston to form a compression chamber, said skirt having ports for establishing communication between the combustion chamber ports and the compression chamber, a by-pass member connecting selected ports in the combustion chamber, means for admitting an overvoluming medium into the by-pass member for discharge into the compression chamber and for discharge from the compression chamber into the by-pass member for flow into the combustion chamber through the selectively connected ports when said ports register with the ports in the skirt of the movable piston, and means for admitting a scavenging medium to the combustion chamber through the other of said ports in the combustion chamber.

2. In an engine of the character described, a combustion chamber having a series of inlet ports, a fixed piston, a movable piston in the combustion chamber having a skirt slidable over the fixed piston to form a compression chamber, said skirt having ports for establishing communication between the combustion chamber ports and the compression chamber, a by-pass member connecting selected ports in the combustion chamber, means for admitting an overvoluming medium into the by-pass member for discharge into the compression chamber and for discharge from the compression chamber into the by-pass member for flow into the combustion chamber through the selectively connected ports when the ports in the skirt of the movable piston register with said ports, means for admitting a scavenging medium to the combustion chamber through the other of said ports in the combustion chamber, and means for controlling admission of the overvoluming medium into the by-pass member.

3. In an engine of the character described, a combustion chamber having a series of inlet ports, a fixed piston, a movable piston in the combustion chamber having a skirt slidable over the fixed piston to form a compression chamber, said skirt having ports for establishing communicaion between the combustion chamber ports and the compression chamber, a by-pass member connecting selected ports in the combustion chamber, means for admitting an overvoluming medium into the by-pass member for discharge into the compression chamber and for discharge from the compression chamber into the by-pass member for flow into the combustion chamber through the selectively connected ports when the ports in the skirt of the movable piston register with said ports, means for admitting a scavenging medium to the combustion chamber through the other of said ports in the combustion chamber, means for controlling admission of the overvoluming medium into the by-pass member, and means controlling discharge of the overvoluming medium from the by-pass member into the combustion chamber.

4. In an engine of the character described, a combustion chamber having a series of inlet ports, a fixed piston, a movable piston in the combustion chamber having a skirt slidable over the fixed piston to form a compression chamber, said skirt having ports for establishing communication between the combustion chamber ports and the compression chamber, a by-pass member connecting selected ports in the combustion chamber, means for admitting an overvoluming medium into the by-pass member for discharge into the compression chamber and for discharge from the compression chamber into the by-pass member for flow into the combustion chamber through the selectively connected ports when the ports in the skirt of the movable piston register with said ports, means for admitting a scavenging medium to the combustion chamber through the other of said ports in the combustion chamber, means for injecting a fuel into the combustion chamber for mixture with the overvoluming medium, and means for igniting said mixture.

5. In an engine of the character described, a combustion chamber having a series of inlet ports, a fixed piston, a movable piston in the combustion chamber having a skirt slidable over the fixed piston to form a compression chamber, said skirt having ports for establishing communication between the combustion chamber ports and the compression chamber, a by-pass connecting selected ports in the combustion chamber, means for admitting an overvoluming medium into the by-pass for discharge into the compression chamber and for discharge from the compression chamber into the by-pass member for flow into the combustion chamber through the selectively connected ports when the ports in the skirt of the movable piston register with said ports, means for admitting a scavenging medium to the combustion chamber through the other of said ports in the combustion chamber, means for controlling admission of the overvoluming medium into the by-pass, means for injecting a fuel into the combustion chamber for mixture with the overvoluming medium, and means for igniting said mixture.

6. In an engine of the character described, a combustion chamber having a series of inlet ports, a fixed piston, a movable piston in the combustion chamber having a skirt slidable over the fixed piston to form a compression chamber, said skirt having ports for establishing communication between the combustion chamber ports and the compression chamber, a by-pass member connecting selected ports in the combustion chamber, means for admitting an overvoluming medium into the by-pass member for discharge into the compression chamber and for discharge from the compression chamber into the by-pass member for flow into the combustion chamber through the selectively connected ports when the ports in the skirt of the movable piston register with said ports, means for admitting a scavenging medium to the combustion chamber through the other of said ports in the combustion chamber, means for controlling admission of the overvoluming medium into the by-pass member, means controlling discharge of the overvoluming medium from the by-pass member into the combustion chamber, means for injecting a fuel into the combustion chamber for mixture with the overvoluming medium, and means for igniting said mixture.

7. In an engine of the character described, a combustion chamber having a series of inlet ports, a fixed piston, a movable piston in the combustion chamber having a skirt slidable over the fixed piston to form a compression chamber, said skirt having ports for establishing communication between the combustion chamber ports and the compression chamber, a by-pass member connecting selected ports in the combustion chamber, means for admitting an overvoluming medium into the by-pass member for discharge into the compression chamber and for discharge from the compression chamber into the by-pass member for flow into the combustion chamber through the selectively connected ports when the ports in the skirt of the movable piston register with said ports, means for admitting a scavenging medium to the combustion chamber through the other of said ports in the combustion chamber, a valve for controlling admission of the overvoluming medium into the by-pass member, a valve controlling discharge of the overvoluming medium from the by-pass member into the combustion chamber, means for injecting a fuel into the combustion chamber for mixture with the overvoluming medium, means for igniting said mixture, and means for operating said valves in timed relation with the movable piston.

8. In an engine of the character described, a combustion chamber having a series of inlet ports and an exhaust port, a fixed piston, a movable piston in the combustion chamber having a skirt slidable over the fixed piston to form a compression chamber, said skirt having ports for establishing communication between the combustion chamber ports and the compression chamber, means connecting said ports in the combustion chamber, means for admitting an overvoluming medium into said connecting means for discharge into the compression chamber and for discharge from the compression chamber into the combustion chamber through said connected ports when the ports in the skirt of the movable piston register with said inlet ports, means for controlling admission of the overvoluming medium, valve means controlling discharge of the overvoluming medium into the combustion chamber, means for actuating said valve means in timed relation with the piston whereby said overvoluming medium is admitted to the combustion chamber after closure of the exhaust port, means for injecting a fuel into the combustion chamber for mixture with the overvoluming medium, and means for igniting said mixture.

9. In an engine of the character described, a combustion chamber having a series of inlet ports, a fixed piston, a movable piston in the combustion chamber having a skirt slidable over the fixed piston to form a compression chamber, said skirt having ports for establishing communication between the combustion chamber ports and the compression chamber, means connecting said ports in the combustion chamber, means for admitting an overvoluming medium into said connecting means for discharge into the compression chamber and for discharge from the compression chamber into the combustion chamber through said connected ports when the ports in the skirt of the movable piston register with said ports, a valve for controlling admission of the overvoluming medium, a valve controlling discharge of the overvoluming medium into the combustion chamber, means for injecting a fuel into the combustion chamber for mixture with the overvoluming medium, means for igniting said mixture, and means for controlling operation of said control valves in timed relation with the movable piston.

10. In an engine of the character described, a combustion chamber, a fixed piston, a movable piston in the combustion chamber cooperating with the fixed piston to form a compression chamber, a by-pass member connecting the compression and combustion chambers, means for admitting an overvoluming medium into the by-pass member for discharge into the compression chamber and for discharge from the compression chamber into the by-pass member for flow into the combustion chamber, a valve for controlling admission of the overvoluming medium from the by-pass member into the combustion chamber, means for admitting a scavenging medium to the combustion chamber, means for controlling admission of the overvoluming medium into the by-pass member, means for injecting a fuel into the combustion chamber for mixture with the overvoluming medium, and means for igniting said mixture.

11. In an engine of the character described, a combustion chamber, a piston, means supporting the piston in fixed relation with the combustion chamber, a movable piston in the combustion chamber having a skirt slidable over the fixed piston to form a compression chamber therebetween, a by-pass connecting the compression chamber with the combustion chamber, a compressor connected with the by-pass for supplying an overvoluming medium at an initial pressure greater than atmosphere, valve means controlling admission of said overvoluming medium through the by-pass into the compression chamber wherein the initial pressure of the overvoluming medium is increased prior to discharge from the compression chamber through the by-pass into the combustion chamber incidental to actuation of said movable piston, a fuel injector connected with the combustion chamber for injecting a fuel into the overvoluming medium to form a combustible mixture, and ignition means for igniting said mixture.

12. In an engine of the character described, a combustion chamber, a piston, means supporting the piston in fixed relation with the combustion chamber, a movable piston in the combustion chamber having a skirt slidable over the fixed piston to form a compression chamber therebetween, a by-pass connecting the compression chamber with the combustion chamber, a compressor connected with the by-pass for supplying an overvoluming medium at an initial pressure greater than atmosphere, valve means controlling admission of said overvoluming medium through the by-pass into the compression chamber wherein the initial pressure of the overvoluming medium is increased prior to discharge from the compression chamber through the by-pass into the combustion chamber incidental to actuation of said movable piston, a fuel injector connected with the combustion chamber for injecting a fuel into the overvoluming medium to form a combustible mixture, ignition means for igniting said mixture, and means connected with the combustion chamber to ignite a scavenging medium prior to admission of the overvoluming medium to said combustion chamber.

LELAND L. SCOTT.